Figure 8:
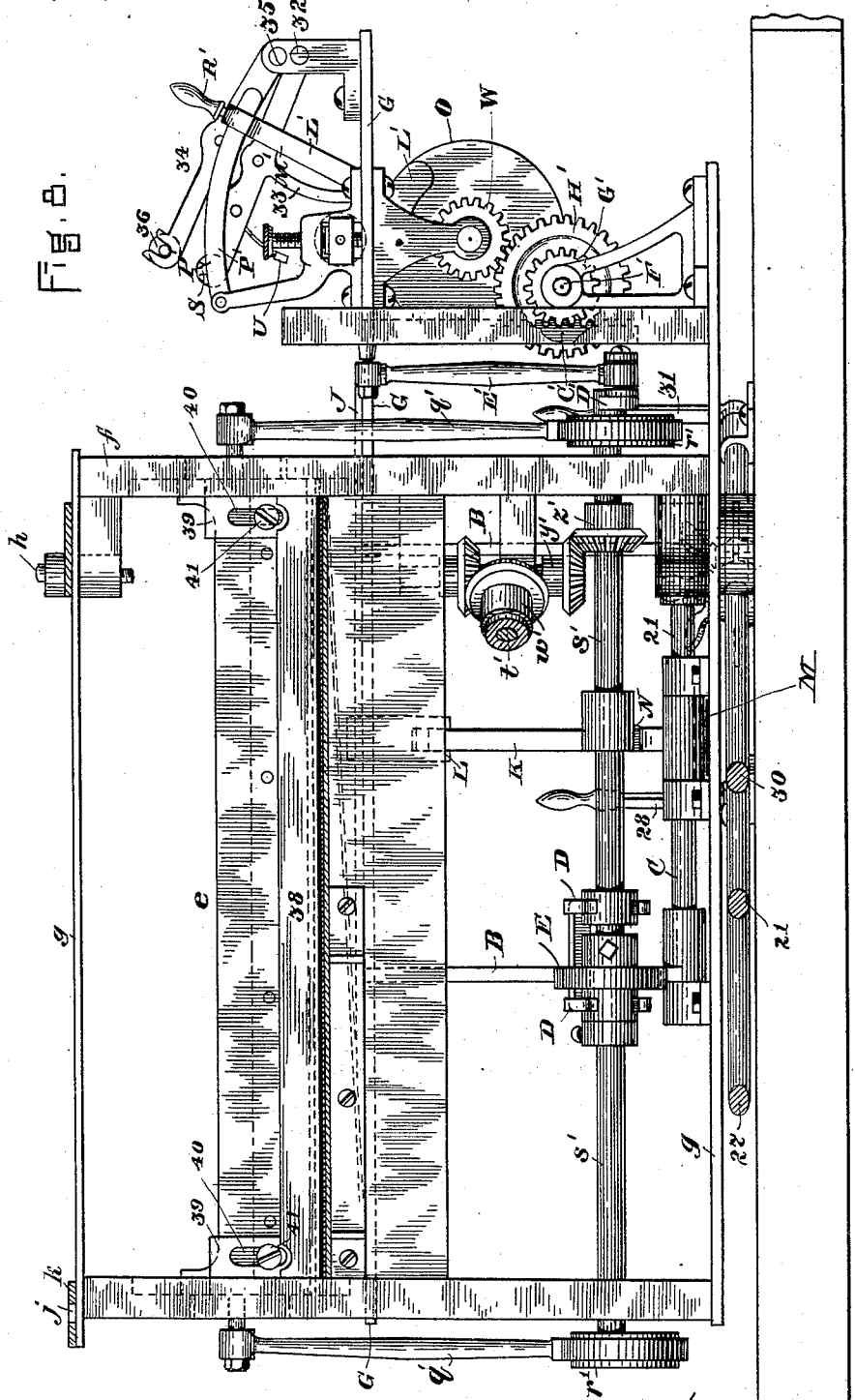

(No Model.)  10 Sheets—Sheet 1.
R. COWEN.
HOSE MACHINE.
No. 422,185.  Patented Feb. 25, 1890.
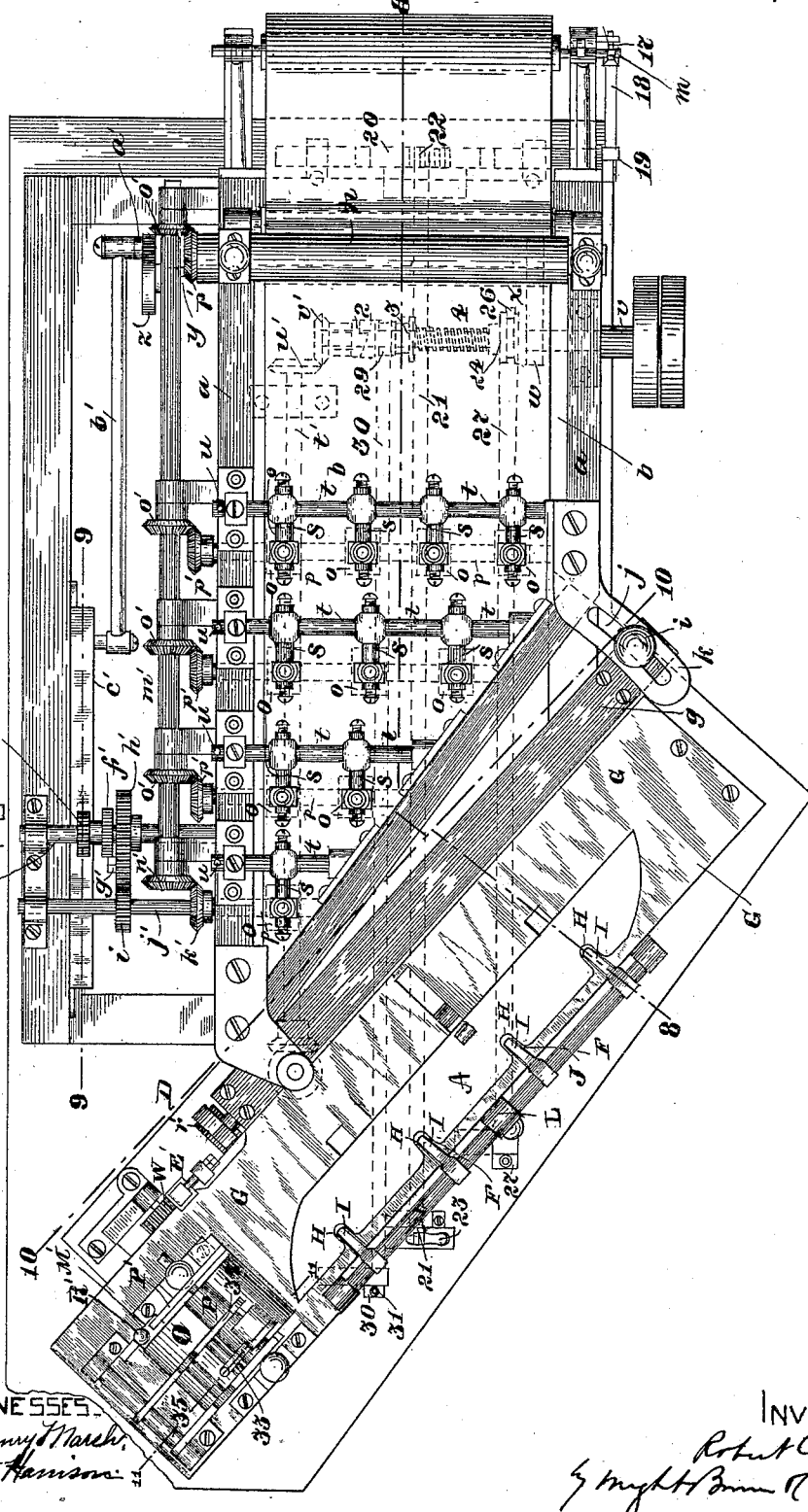
WITNESSES.
INVENTOR.

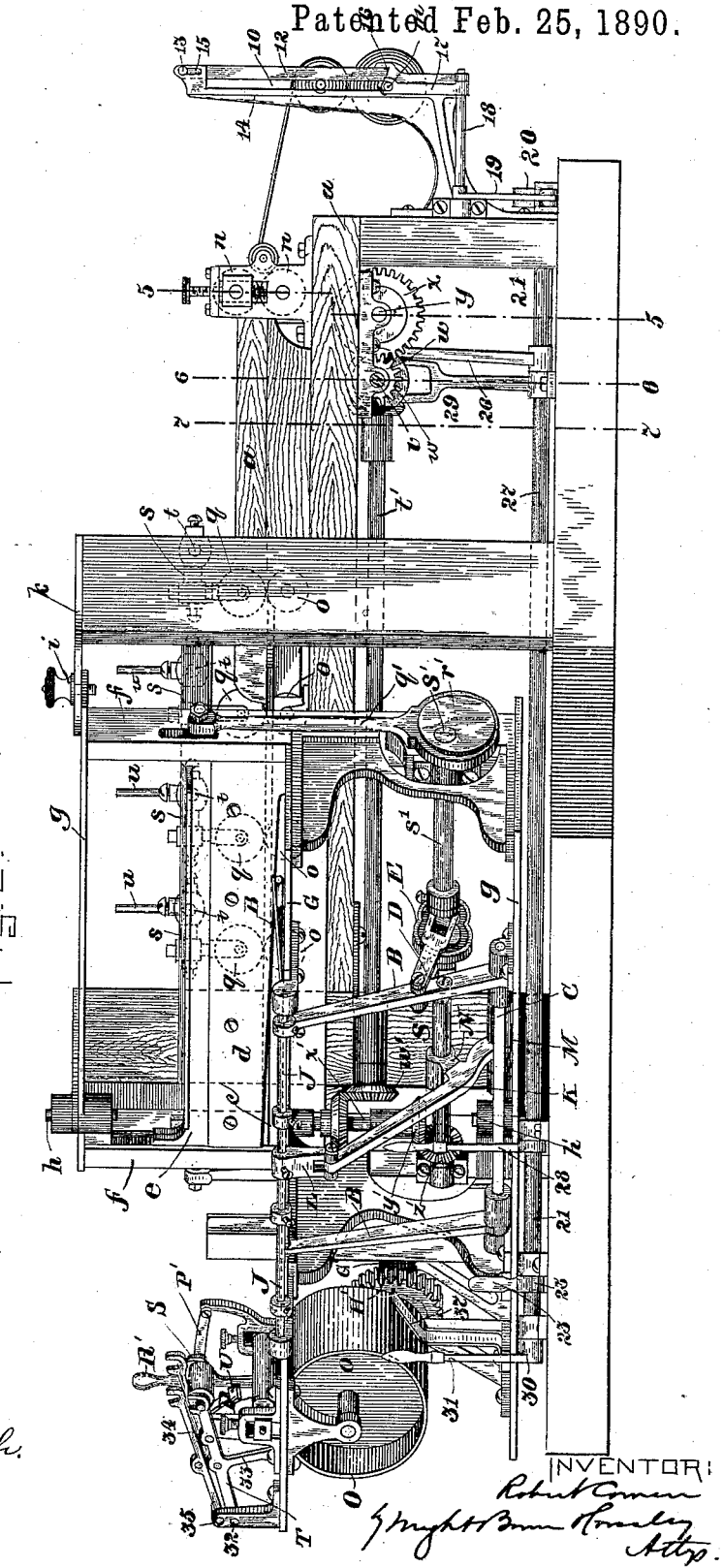

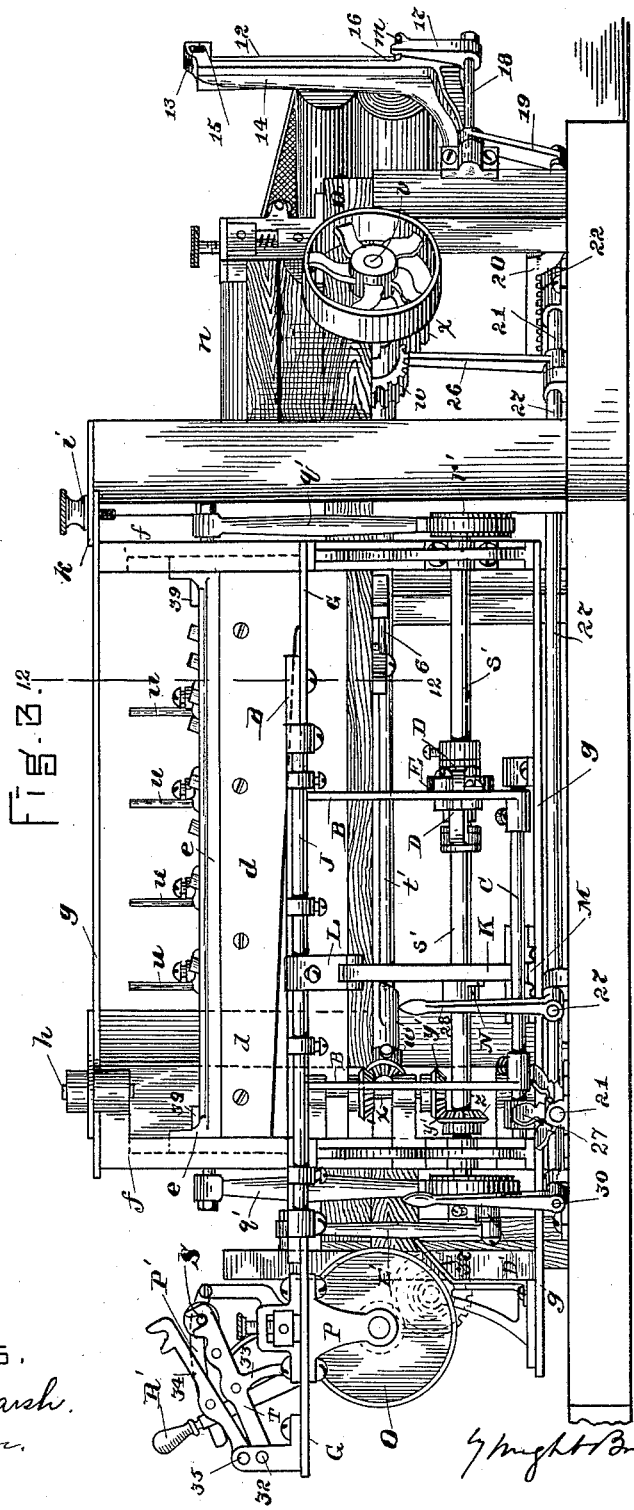

(No Model.)  R. COWEN.  10 Sheets—Sheet 4.
HOSE MACHINE.
No. 422,185.  Patented Feb. 25, 1890.
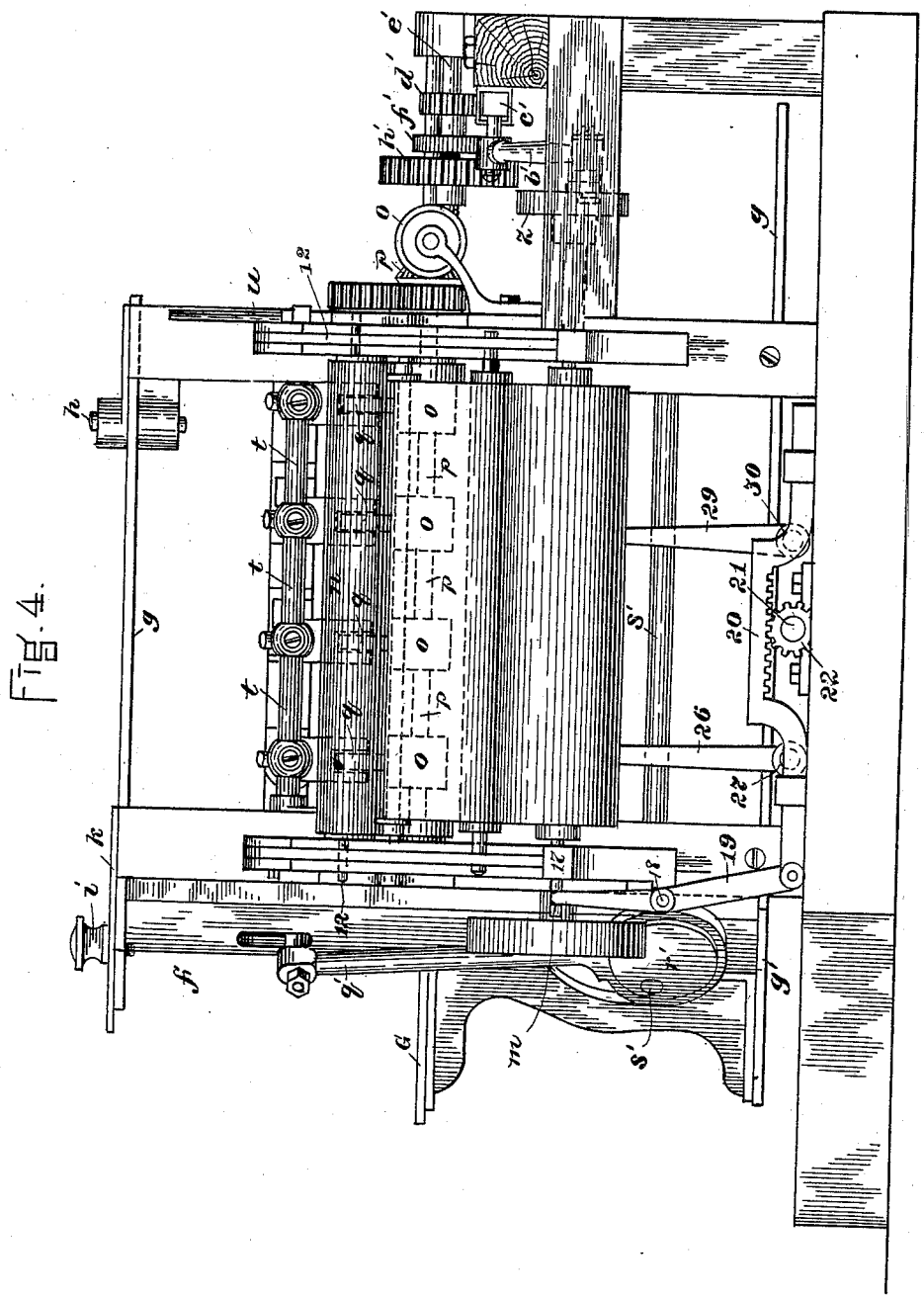
WITNESSES.
R. Henry Marsh.
A. D. Harrison.
INVENTOR.
Robert Cowen
by Knight Brown Kinsley
Attys.

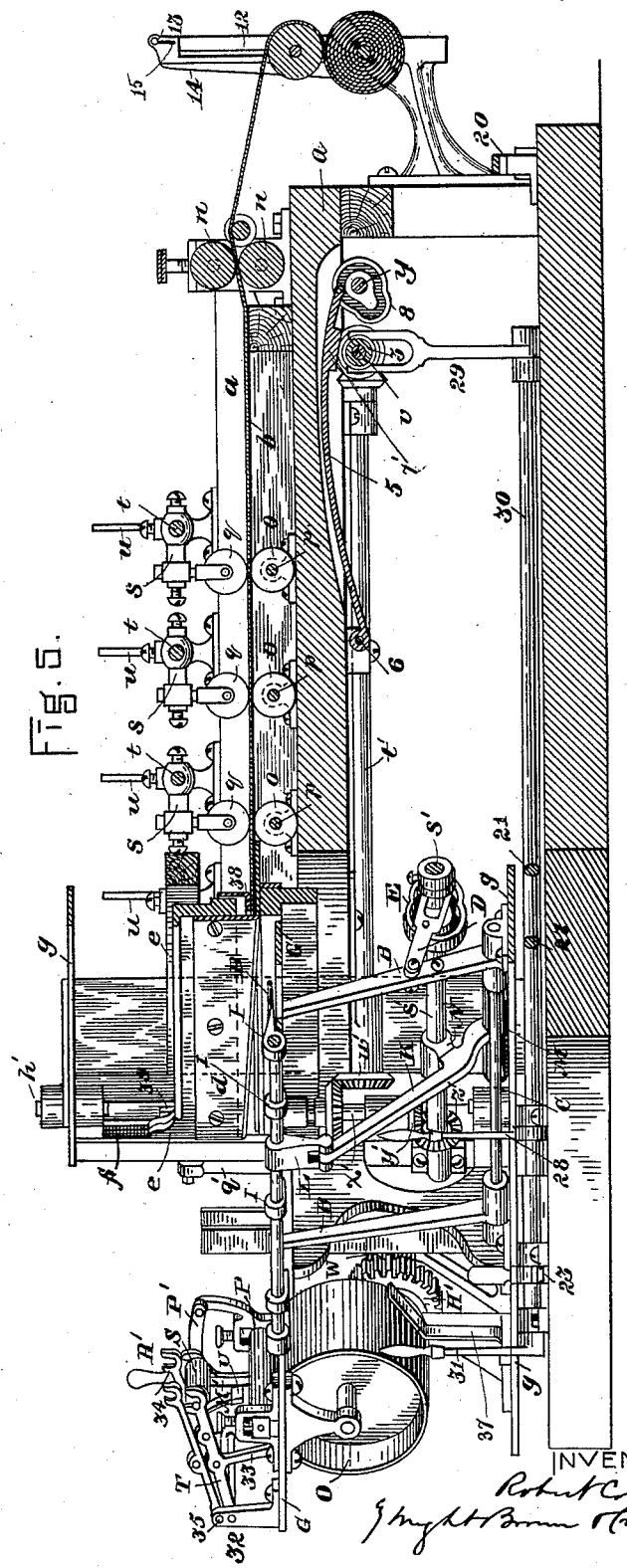

(No Model.) 10 Sheets—Sheet 6.
R. COWEN.
HOSE MACHINE.
No. 422,185. Patented Feb. 25, 1890.
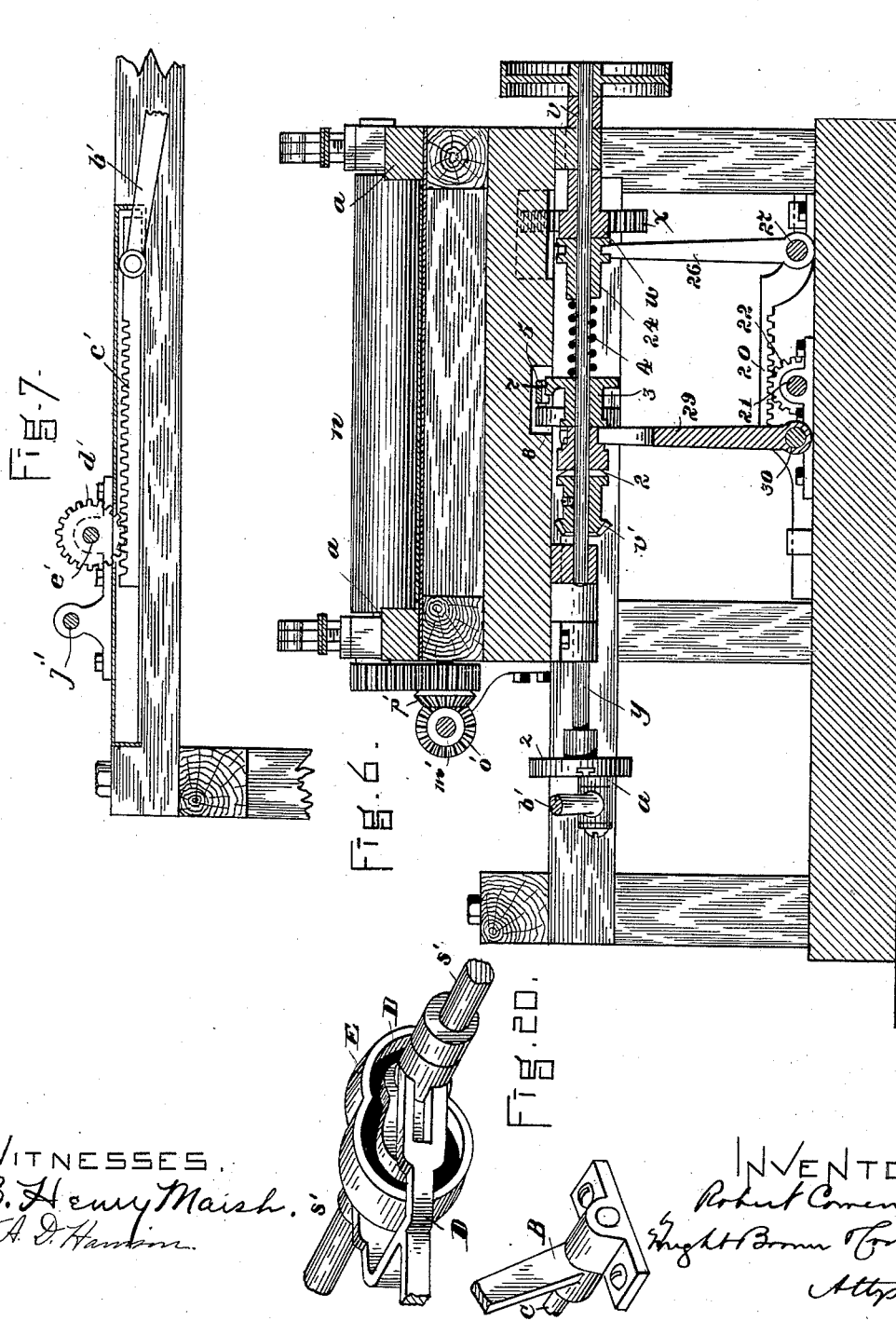
WITNESSES.
R. Henry Maish.
A. D. Hanson.
INVENTOR.
Robert Cowen
by Hugh F. Brown Crosby
Attys.

(No Model.) 10 Sheets—Sheet 7.
R. COWEN.
HOSE MACHINE.

No. 422,185. Patented Feb. 25, 1890.

WITNESSES: INVENTOR.

(No Model.)  10 Sheets—Sheet 8.
R. COWEN.
HOSE MACHINE.
No. 422,185. Patented Feb. 25, 1890.
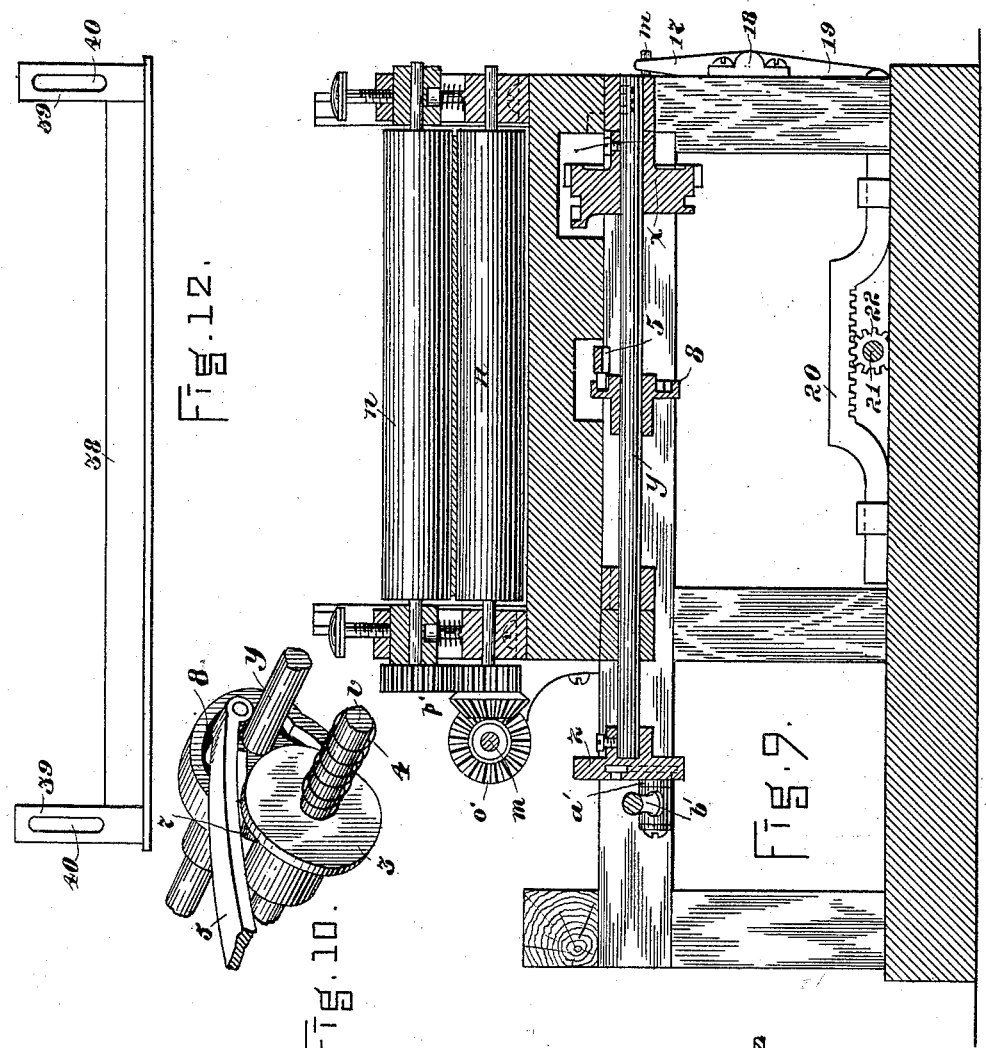
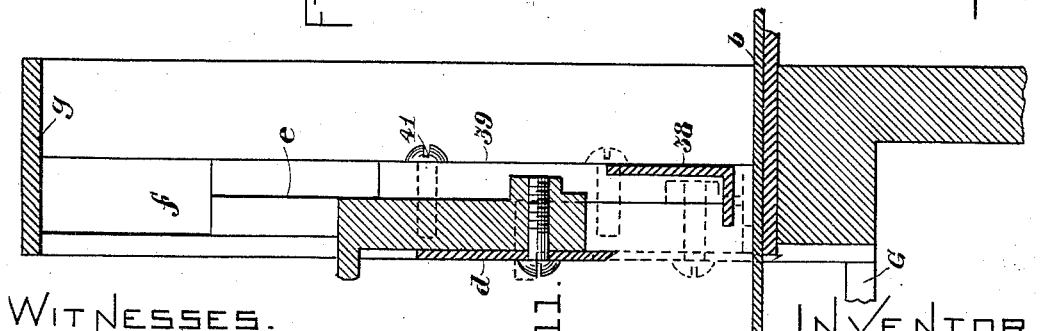
Witnesses.
R. Henry Marsh.
A. D. Hanson.
Inventor.
Robert Cowen

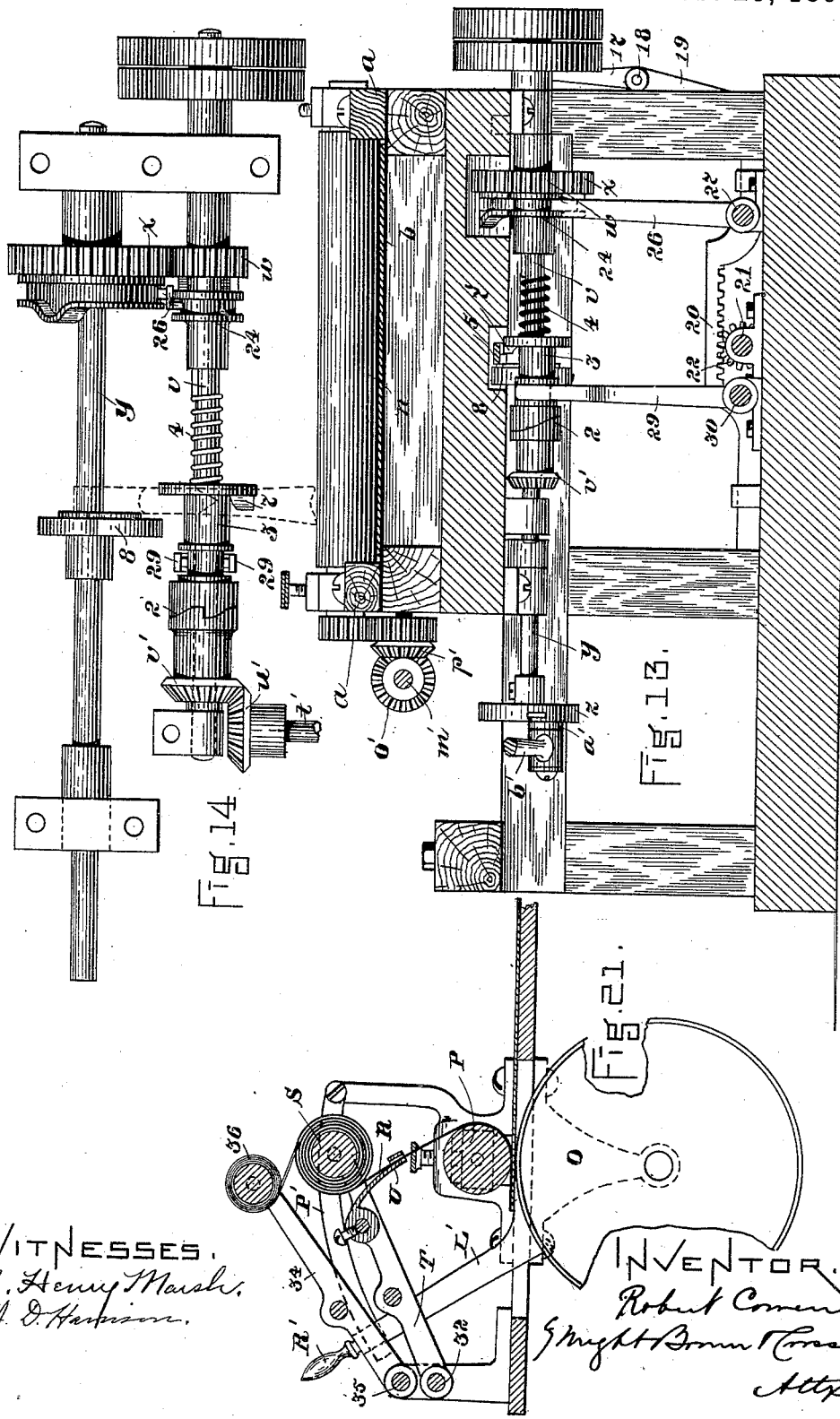

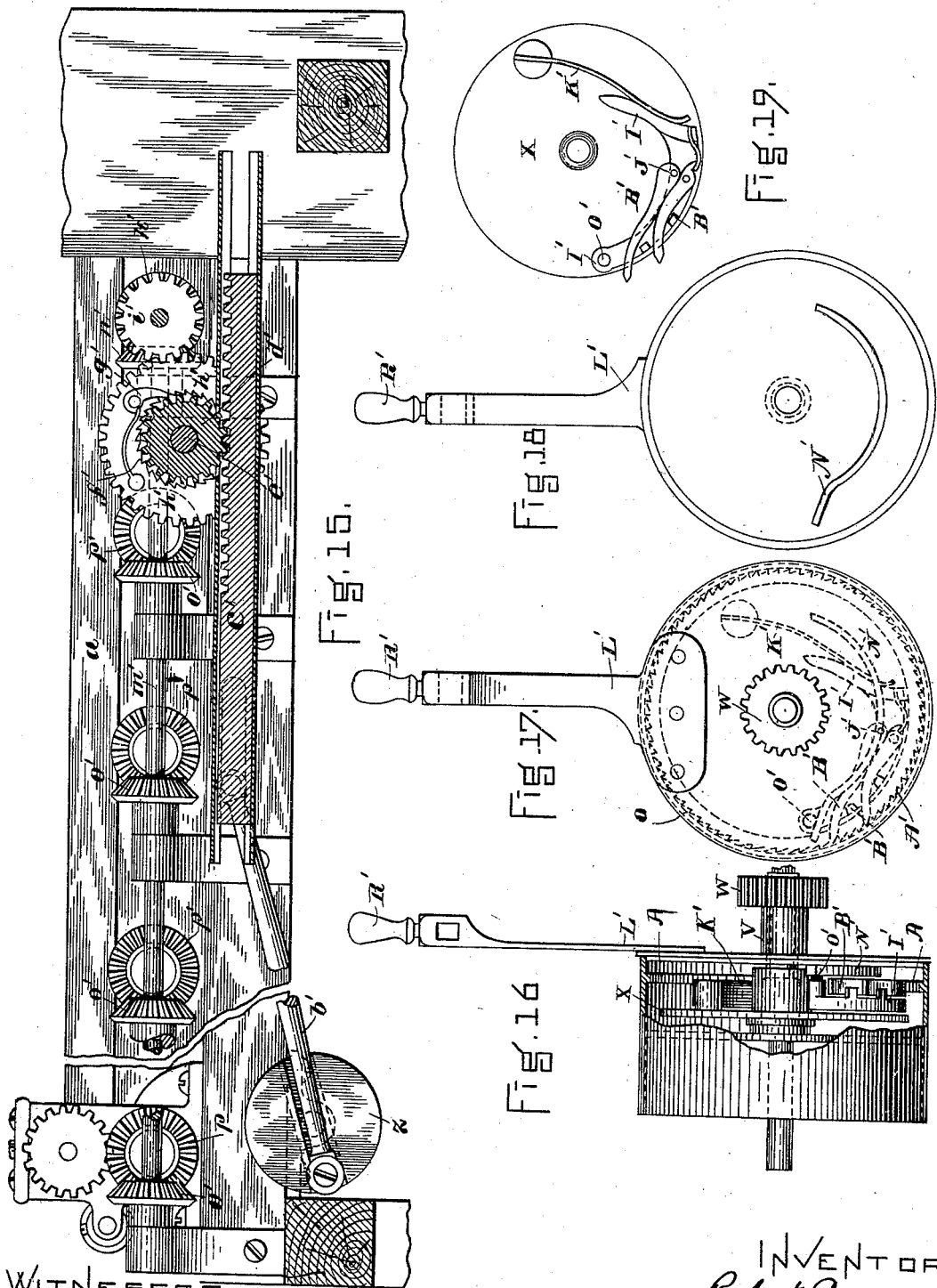

UNITED STATES PATENT OFFICE.

ROBERT COWEN, OF CAMBRIDGE, ASSIGNOR TO THE BOSTON WOVEN HOSE COMPANY, OF BOSTON, MASSACHUSETTS.

HOSE-MACHINE.

SPECIFICATION forming part of Letters Patent No. 422,185, dated February 25, 1890.

Application filed January 29, 1889. Serial No. 297,989. (No model.)

*To all whom it may concern:*

Be it known that I, ROBERT COWEN, of Cambridge, in the county of Middlesex and State of Massachusetts, have invented certain new and useful Improvements in Machines for Cutting Fabric into Strips and Preparing the Same for the Manufacture of Hose, of which the following is a specification.

This invention relates to the manufacture of hose from strips of canvas or duck. In preparing fabric of this kind for the manufacture of hose it is customary to cut the fabric diagonally into strips of uniform width, the diagonal cutting making the ends of the strips diagonal to their longer edges, so that when said ends are connected to form a long strip, which is afterward made into a tube constituting the hose, the seams or joints at the united ends of the strips or sections will be diagonal to the edges of the strip, and will therefore be longer and will have more strength than if they extended directly across the strip at right angles with the edges thereof.

The invention has for its object to provide a simple machine adapted to be controlled by one attendant, whereby a web of canvas or duck can be cut diagonally into strips for the manufacture of hose, and whereby a strip of adhesive material may be applied to one edge of each strip.

The invention consists in the several improvements which I will now proceed to describe and claim.

In the accompanying drawings, forming a part of this specification, Figure 1 represents a top view of my improved machine. Fig. 2 represents a side elevation of the same. Fig. 3 represents a front end elevation. Fig. 4 represents a rear end elevation. Fig. 5 represents a section on line 8 8, Fig. 1. Fig. 6 represents a section on line 6 6, Fig. 2. Fig. 7 represents a section on line 9 9, Fig. 1, looking toward the left. Fig. 8 represents a section on line 10 10, Fig. 1. Fig. 9 represents a section on line 5 5, Fig. 2. Figs. 10 and 12 represent details. Fig. 11 represents a section on line 12 12, Fig. 3. Fig. 13 represents a section on line 7 7, Fig. 2. Fig. 14 represents a top view of the driving-shaft and the shaft to which the same is geared. Fig. 15 represents a section on line 9 9, Fig. 1, looking toward the right. Figs. 16, 17, 18, and 19 represent views of the strip-feeding roll and portions of the mechanism for rotating it. Figs. 20 and 21 represent detail views.

The same letters and numerals of reference indicate the same parts in all the figures.

In the drawings, $a$ represents a frame, which supports a horizontal bed or table $b$, over which the web to be cut is moved by feed-rolls to the cutting devices which sever it into strips, said devices being, as here shown, a fixed blade $c$ at the end of the bed $b$ and a vertically-reciprocating blade $d$, attached to a cross-head $e$, which is reciprocated in slots or guides in uprights $f f$ by mechanism hereinafter described. The said blades co-operate with each other in severing the fabric and are arranged diagonally with relation to the bed $b$, so as to cut the fabric diagonally. I prefer to make the angle at which the fabric is cut adjustable, and to this end I connect the uprights $f f$ by horizontal top and bottom pieces $g g$, thus forming a frame, which is connected by hinges $h h$ with the supporting-frame $a$. The fixed shear-blade $c$ is attached to said frame, which also supports the mechanism actuating the reciprocating shear-blade, so that the said blades can be caused to assume different angles with relation to the bed $b$ by swinging the said frame on its hinges $h h$. The frame may be secured at any angle to which it may be adjusted by any suitable means—as, for example, clamping-screw $i$ on its swinging end and a plate $k$, affixed to the frame $a$ and having a segmental slot $j$, in which said screw moves when the frame is being adjusted. When the screw is turned downwardly, its head bears on the plate $k$, and thus secures the cutter-frame to said plate. The web to be cut is rolled on a mandrel $m$, the ends of which project into vertical slots in brackets attached to the frame $a$. The fabric passes from the roll between two positively-rotated feed-rolls $n n$ at the outer end of the bed $b$, and is unwound intermittingly from the mandrel by the operation of said rolls.

At suitable points in the bed $b$ are feed-rolls o, attached to arbors p under the bed b, said feed-rolls being rotated intermittingly in unison with the feed-rolls n n by mechanism to be described. Each feed-roll o is here shown as composed of several sections projecting through slots in the bed b; but it is obvious that each roll can be made continuous instead of being in sections. The rolls o o decrease in length, as shown in Fig. 1, toward the cutting-blades, on account of the diagonal arrangement of the cutting-blades, said rolls being thus adapted to control the acute-angled portion of the web, which they could not do if all were of the same length.

Over the feed-rolls o are arranged idle-rolls q, said idle-rolls being journaled in lugs attached to arms s, which in turn are attached to shaft t, journaled in bearings on the frame a. The idle-rolls bear by their own weight on the fabric and hold it against the positively-rotated rolls o, and they may be raised by partly rotating the shafts t, which are provided with handles u for this purpose. The mechanism which intermittingly rotates the said feed-rolls is as follows: v represents a driving-shaft journaled in bearings under the bed b and having a gear w meshing with a gear x on a shaft y, which is also journaled under the bed b, and has at one end a disk z, carrying an eccentrically-located wrist-pin $a'$. Said pin is connected by a rod $b'$ with a rack $c'$, which is fitted to slide in a horizontal guide or casing attached to the frame a. $d'$ represents a pinion meshing with said rack and mounted to run loosely on a shaft $e'$, which is journaled in bearings on the frame a. To the pinion $d'$ is affixed a ratchet $f'$, which, like the pinion, is loose on the shaft $e'$. With said ratchet engages a pawl $g'$, which is pivoted to the side of a gear $h'$, affixed to the shaft $e'$. The rack $c'$ is reciprocated by the rotary motion of the disk z, imparted through the rod $b'$, and causes the pinion $d'$ and ratchet $f'$ to rotate first in one direction and then in the opposite direction. The ratchet in rotating one way engages the pawl $g'$, and through the latter rotates the gear $h'$, but in rotating the other way slips on the pawl without rotating said gear, so that the gear is intermittingly rotated. The gear $h'$ imparts its intermittent rotation to the feed-rolls o and n n through a gear $i'$, attached to a shaft $j'$, a bevel-pinion $k'$ on said shaft, and a long shaft $m'$, having a bevel-gear $n'$, meshing with the bevel-gear $k'$, and a series of bevel-gears $o'$, meshing with the bevel-gears $p'$ on the shafts of the feed-rolls o. The upper feed-roll n is geared to the lower feed-roll n and is positively rotated thereby. The bed b furnishes a support for the fabric between the feed-rolls and prevents it from falling between the rolls; but it is obvious that rods or other devices for supporting the fabric between the rolls may be substituted for the bed.

The mechanism for reciprocating the shear-blade d is as follows: The cross-head e, carrying said blade, is connected by rods $q'$ $q'$ with straps encircling eccentrics $r'$ on a horizontal shaft $s'$, which is journaled in bearings on the base g of the swinging knife-carrying frame and is rotated intermittingly by mechanism to be described, the rotation of said shaft causing the eccentrics $r'$ to reciprocate the cross-head, the periods of rotation of the shaft $s'$ alternating with those of the feed-rolls o and n n, so that the blade d is operated while the rolls are at rest, and vice versa.

The intermittent rotation of the shaft $s'$ is accomplished by the following devices: A shaft $t'$, journaled in bearings under the bed b and extending longitudinally of the same, is provided at one end with a bevel-gear $u'$, meshing with a loose bevel-gear $v'$ on the driving-shaft v, and at the opposite end with a bevel-gear $w'$, meshing with a similar bevel-gear affixed to a short vertical shaft $x'$, journaled in bearings on the frame a. On the lower end of said shaft $x'$ is a bevel-gear $y'$, meshing with a bevel-gear $z'$ on the blade-operating shaft $s'$. The loose bevel-gear $v'$ on the driving-shaft is provided with a clutch member 2 on its hub. A sliding clutch 3, which is keyed to the driving-shaft, so as to be continuously rotated thereby, and yet be capable of sliding thereon, is pressed by a spring 4 toward the clutch 2, the two clutches being normally engaged by said spring, so that the rotation of the driving-shaft is imparted to the shaft $t'$, and through the latter and the vertical shaft $x'$ to the blade-operating shaft $s'$. The sliding clutch is, however, forced back from the clutch 2 at intervals by a swinging arm 5, which is pivoted at 6 to the frame a under the bed b, and is so arranged that a wedge-shaped projection $7'$ on its swinging end gravitates into position to act on a projection 7 on a flange formed on the sleeve or hub of the sliding clutch 3. When the projection 7 is brought by the rotation of the driving-shaft into contact with the projection $7'$ of the arm 5, the clutch 3 is forced away from the clutch 2 by such contact and the rotation of the shaft $t'$ is suspended until the arm 5 is raised above the projection 7 of the sliding clutch, thus permitting the spring 4 to re-engage the clutches 2 3. The raising of the arm 5 is effected by a cam 8 on the shaft y. Said cam is continuously rotated with the shaft y by the previously-described connection of the latter with the driving-shaft, and is so timed that it raises the arm 5 just after the stoppage of the rotation of the feed-rolls and holds said arm raised until just before the rotation of the feed-rolls is resumed. The described mechanism is so timed that the arm 5 is held in a raised position and the feed-rolls are kept from rotating while the knife is descending from its highest position and returning to said position after cutting the fabric. The cam 8 releases the arm 5 and the latter displaces the clutch 3 and makes the knife-operating mechanism inoperative when the knife is at its highest point, the feed-rolls at the same time resuming their operation and feeding the fabric forward under the raised knife, which descends after the feed movement has stopped and severs a strip of the fabric. The severed strip falls on a laterally-reciprocating plate or carrier A, which is mounted on arms B B, affixed to a horizontal rock-shaft C, journaled in bearings on the floor or base supporting the machine. One of the arms B is connected by a link or yoke D with a cam E on the shaft s', said cam having a groove which receives a trundle-roll on the link or yoke D. The rotation of the cam E oscillates the arms B B and shaft s', and thereby carries the plate A alternately from and toward the cutting-blades c d. The cam E is timed so that it holds the plate A stationary at its nearest approach to the cutting-blades while the blade d is descending and severing the fabric, and then moves the plate away from the blades, causing it to carry the severed strip edgewise until its outer edge is over a series of fixed jaws or projections F on a bed or table G under the plate. A series of slots H, coinciding with said jaws, are formed in the plate A, said slots receiving the jaws F, so that the upper surfaces of the jaws are about flush with the upper surface of the plate A.

I I represent a series of movable jaws attached to a rock-shaft J, which is journaled in bearings on the edge of the table G, and is oscillated so as to alternately press the jaws I down upon the fixed jaws or upon the fabric resting thereon to hold the fabric and raise said jaws to release the fabric by an arm K, which is hinged at its lower end to the base-piece g, and is jointed at its upper end to an arm L, attached to the rock-shaft J. The arm K is pressed upwardly by a spring M against a collar affixed to the shaft s', and, excepting when pressed away from said collar by a cam or toe N thereon, holds the jaws I away from the fixed jaws F. The cam N is timed to move the arm K, and thereby press the jaws I upon the outer edge of the strip of fabric after the latter has been carried from the cutting-blades by the plate A and to hold the jaws upon said strip while the plate A is moving back to the cutting-blades, the strip being thus deposited upon the table G, after which the cam N releases the arm K, and the spring M moves said arm upwardly and causes it to raise the jaws I and release the strip of fabric, which is now free to be moved endwise by feeding pressure-rolls O P, presently described. One end of the said strip overlaps the end of the preceding strip which has been moved along the table by said rolls. The operator, by moving his thumb along said overlapping edges or otherwise applying pressure thereto, causes said ends to adhere to each other, the fabric composing the strips being coated or saturated with rubber, so that it has an adhesive quality. The feeding pressure-rolls last referred to are intermittingly rotated, and after the ends of the strips have been united, as above described, the rolls operate to move the last-cut strip lengthwise from the table. Said feeding pressure-rolls are composed of a feed-roll O, which is intermittingly rotated by means described later, and a pressure-roll P, which is journaled in vertically-movable bearings above the roll O and is pressed toward the latter by springs acting on said bearings. The function of the rolls O P is to press together the strip of fabric and a narrow strip or ribbon R of adhesive rubber, which ribbon is wound on a loose roll S, journaled in bearings in a frame T above the rolls O P. Said frame has a guide U, through which the ribbon passes to the upper surface of the strip of fabric on which the ribbon is laid. The strip and ribbon are passed between the rolls O P, and the ribbon is caused to adhere to the strip by the pressure of the said rolls. The lower roll O is intermittingly rotated by the following devices: On the shaft of said roll is loosely mounted a sleeve V, to which is affixed a gear W and a plate or pawl carrier X, the former being at the outside and the latter at the inside of the roll O. On the inner periphery of the roll O are formed internal ratchet-teeth A', with which engage one or more pawls B', carried by the plate X, said pawls being pressed outwardly by springs, and thus held in contact with the ratchet-teeth A'. When the gear W and plate X are rotated in one direction, the pawls B' engage the ratchet-teeth and rotate the roll O; but when said gear and plate are rotated in the opposite direction the pawls slip on the ratchet-teeth without rotating the roll. The gear W and the pawl-carrying plate X connected therewith are rotated alternately forward and backward by a rack C', which is reciprocated in a vertical guide by a crank D' on the shaft s' and a rod E', connecting the wrist-pin of said crank with the rack C'. The reciprocating motion of said rack is transmitted to the gear W and plate X by a shaft F', having a gear or pinion G', meshing with the rack C', and a larger gear H', meshing with the gear W. The described intermittent rotation of the rolls is timed to take place after the jaws I have been raised from the strip of fabric and while the plate A is in its strip-receiving position. The pawls B' are attached to the outer ends of spring-arms, which normally press them outwardly against the ratchet-teeth A'. The inner ends of said spring-arms are secured to an arm I', which is pivoted at J' to the plate X and has its outer or swinging end pressed outwardly by a spring K', which normally holds said arm in position for its pawls B' to engage with the ratchet-teeth A' and permits the arm I' to be pressed inwardly to hold the pawls out of engagement with said ratchet-teeth. The object of this provision for making the pawls B' inoperative is to enable the operator to vary the extent of each rotation of the feed-roll O, and therefore the length of the longitudinal movement of the strip. To this end a plate L', having a handle or lever M', is mounted loosely on the shaft of the roll O and is capable of being turned in either direction on said shaft by the handle M'. To one side of the plate L' is affixed a rib or switch N', a portion of which is concentric with the shaft of the roll O, while one end is inclined outwardly from said concentric portion. The inclined portion of the switch is arranged to come in contact with a stud O' on the pawl-carrying arm I' when the plate L' is turned to a position to bring said inclined portion into the path in which the stud O' oscillates, said stud being oscillated by the described backward and forward rotary movements of the plate X. The arm I' is thrown inwardly by the contact of its stud O' with the inclined portion of the rib N', and the pawls B' are thereby made inoperative. The plate L' may be adjusted so that its rib will displace the pawl-arm I' at any desired point in the backward movement of the latter, so that during the succeeding forward or operative movement of the pawls they will engage with the ratchet-teeth A' only after they have passed away from the switch or rib, and will therefore rotate the roll O a distance dependent on the adjustment of the switch. The handle or lever M', by which the switch is adjusted, has a socket or slot near its outer end, through which passes a segmental bar P', affixed to a post or bracket on the table G. Said bar is provided with marks or graduations suitably numbered to indicate the length of feed movement of the roll O that will be permitted by any position of the handle M' within the limits of its movement. Said handle is provided with a screw R', by which it may be positively secured to the segmental bar P' at any desired point. From the foregoing it will be seen that as each strip is cut off by the blades $d$ it is carried across the table G, grasped by the jaws I, (while the carrying-plate A is returning for another strip,) and then, after being secured to the preceding strip, is passed, with the rubber strip, between the rolls. A strip of indefinite length is thus formed, which is afterward cut into sections and made into hose in any suitable way.

Having now described the principal parts of the machine and their operation, I will describe certain minor details which I have thus far omitted to mention.

One side of each of the vertical slots 10, which receive the ends of the web-holding mandrel $m$, is composed of a movable bar 12, pivoted at 13 to the fixed vertical bar 14, composing the other side of said slot, the pivot 13 passing through a vertical slot 15 in the upper end of said movable bar. Said slot permits the bar to be raised to disengage its pointed lower end from a notch or fixed socket 16 formed to receive it. When the bar 12 is raised, it may be swung away from the fixed bar 14 to permit the removal and insertion of the mandrel. Said mandrel may be moved lengthwise to adjust the web laterally with relation to the bed $b$ by means of a lever 17, affixed to a rock-shaft 18, which is journaled in fixed bearings, the forked outer end of said lever being engaged with a groove in the mandrel, another lever 19, affixed to said rock-shaft and projecting downwardly therefrom, a rack 20, adapted to slide in fixed guides and jointed at one end to the lever 19, and a shaft 21, extending lengthwise of the bed and having at one end a pinion 22, meshing with said rack, and at the other end one or more arms or pedals 23, arranged to be moved by the foot of the operator standing at the front of the table G. The rotation of said shaft causes the rack 22 to move endwise and impart a similar movement to the mandrel $m$ through the rack 20, shaft 18, and levers 17 and 19.

The gear $w$, that transmits motion from the driving-shaft $v$ to the feed-roll-actuating shaft $y$, is loose upon said shaft and is operatively connected therewith by a movable clutch 24, which is keyed to the driving-shaft, so as to be capable of sliding thereon, and engages with a similar clutch 25 on the gear $w$. Said sliding clutch 24 is engaged with the swinging end of a lever 26, which is affixed to a rock-shaft 27, journaled in fixed bearings. Said shaft extends to a point under or near the table G, where the operator stands, and is there provided with a lever 28, arranged to be grasped by the operator, who is enabled to turn the shaft 27, and thereby throw the movable clutch out of engagement with the clutch on the gear $w$, and thus prevent the operation of the machine when it is desirable to do so.

The sliding clutch 3, that makes operative the loose bevel-gear $u'$, whereby motion is communicated from the driving-shaft to the shaft $t$ and the strip severing and feeding devices, is engaged with the forked end of a lever 29, the other end of which is attached to a shaft 30, which is journaled in fixed bearings and extends substantially parallel with the shafts 21 and 27 to a point near the operator's station at the table G, where it is provided with a lever 31, whereby the operator may throw the clutch 3 out of engagement with the clutch of the bevel-gear $u'$, and thus stop the operation of the severing-blade $d$ and strip-feeding roll O whenever it is desired to feed the web forward without cutting—as, for example, at the commencement of the operation before the end of the web has been cut diagonally. It will be seen, therefore, that an attendant standing at the table G is enabled to control the machine without leaving his station.

The frame T, supporting the rolls S, on which the rubber ribbon R is wound, is pivoted at 32 to lugs on the table G and is capable of swinging up and down. A lug 33 on said frame limits the downward movement of the frame by bearing on the table.

34 represents another frame pivoted at 35 above the frame T. The swinging end of the upper frame has sockets or bearings for another roll 36, on which is wound the strip of cloth that is wound with the rubber strip on the roll S to prevent the convolutions of the rubber strip from sticking together. The upper roll is in contact with the rubber on the roll S and is rotated by the latter, so that it winds up the cloth strip as fast as it is unwound with the rubber strip.

37 represents a brake, which bears on the periphery of the strip-feeding roll to prevent the too free rotation of the latter.

It will be observed that although the table and blade supporting frame is hinged so that it can be turned to vary the angle of the blades with the web-supporting bed $b$, the swinging movements of said frame do not disturb the operative connection of the shafts $t$ and $s'$, because the short vertical shaft $x'$, connecting said shafts, is in line with the hinges $h\ h$, connecting the table G with the supporting-frame $a$. The end of the web is held on the fixed blade during the descent of the blade $d$ by a bar 38, having ears or lugs 39, containing vertical slots 40, which enable the bar to slide vertically on studs 41, passing through said slots into the cross-head $e$. When the cross-head is raised, the upper ends of the slots 40 bear on the studs 41, and as the cross-head descends with the blade $d$ the bar 38 bears on the web close to the line along which it is cut and remains thereon until the cutting is completed, the studs 41 moving down in the slots 40, which remain stationary during the descent of the blade. The series of feed-rolls $o$, made of decreasing length, so as to act on the web at points close to an oblique line along which the web is cut, and the correspondingly-arranged top rails $q$ may be used in connection with any other suitable means for cutting the web. For example, a diagonally-arranged straight-edge or guide—such as the bar 38 and a knife held by the operator and moved by the operator's hand along said guide—may be used instead of the power-reciprocated blade $d$ without departing from the spirit of the invention. It is also practicable to dispense with the strip-carrying plate A; but in this case the operator or an attendant would have to move each strip away from the cutters out of the way of the next strip, so that the machine without said plate would not be as desirable as with it.

The upper rolls $q$, which co-operate with the feed-rolls $o$, may be positively rotated instead of being loose, their rotation being opposite to that of the supporting-rolls O and intermittent like that of said supporting-rolls.

An application filed concurrently herewith by George C. Beckwith and myself, Serial No. 297,985, shows and describes the mechanism shown and described in this application, certain parts of the machine not herein claimed being the joint application of said Beckwith and myself. I do not therefore claim in this application as sole inventor anything claimed in the said application, Serial No. 297,985.

I claim—

1. In a machine for preparing fabric for the manufacture of hose, a series of intermittingly-rotating parallel feed-rolls journaled at one end in the same plane and made successively shorter, said rolls decreasing in length toward the delivering end of the series, whereby said rolls are enabled to act on a web of material along a line which is diagonal to the direction in which they feed said web, combined with correspondingly-arranged loose rolls located over said supporting-rolls and movable toward and from the latter, and a table G, arranged diagonally with relation to the said rolls and in position to receive a diagonal strip cut from said web, as set forth.

2. In a machine for preparing fabric for the manufacture of hose, the combination of a series of intermittingly-rotating parallel feed-rolls journaled at one end in the same plane and made successively shorter, loose rolls co-operating therewith, a table G, arranged diagonally with relation to said rolls, so as to receive a diagonal strip cut from the web fed thereby, and a pair of pressure-rolls, whereby said strip and an adhesive strip laid thereon may be pressed together, as set forth.

3. In a machine for preparing fabric for the manufacture of hose, the combination of a series of feed-rolls journaled at one end in the same plane and made successively shorter, mechanism for intermittingly rotating the same automatically, loose rolls co-operating with said feed-rolls, a cutter arranged diagonally with relation to said rolls, and automatic mechanism for operating the cutter, said mechanism alternating in its action with said feed-rolls, whereby a web of material is fed intermittingly and severed after each movement, as set forth.

4. In a machine for preparing fabric for the manufacture of hose, the combination of a series of feed-rolls journaled at one end in the same plane and made successively shorter, mechanism for intermittingly rotating said rolls, loose rolls co-operating therewith, a cutter arranged diagonally with relation to said rolls, automatic operating mechanism for said cutter alternating in its action with the feed-roll-operating mechanism, and a hinged frame supporting said cutter, whereby the cutter may be adjusted at different angles to the feed-rolls, as set forth.

5. In a machine for preparing fabric for the manufacture of hose, the combination of a series of feed-rolls, mechanism for intermittingly operating the same, a hinged frame at the delivering end of the series of feed-rolls and adapted to stand at different angles, a fixed shear-blade attached to said frame and adjustable therewith, a co-operating-blade vertically movable in guides on said frame, and mechanism for intermittingly operating said movable blade, as set forth.

6. In a machine for preparing fabric for the manufacture of hose, the combination of a series of feed-rolls journaled at one end in the same plane and made successively shorter, mechanism for intermittingly operating the same, loose rolls co-operating with said feed-rolls, a reciprocating cutter diagonally arranged with relation to said feed-rolls, mechanism for intermittingly operating said cutter, a hinged frame supporting said cutter, whereby the cutter may be adjusted at different angles, and means for positively holding said frame at any angle to which it may be adjusted, as set forth.

7. In a machine for preparing fabric for the manufacture of hose, the combination of the series of positively-rotated feed-rolls $o$, the shaft $t$, journaled in bearings above said rolls, the arms attached to said shafts, the idle-rolls journaled in ears on said arms and arranged to co-operate with the feed-rolls $o$, and the severing mechanism to which the fabric is presented by said feed-rolls, as set forth.

8. In a machine for preparing fabric for the manufacture of hose, the combination of the series of feed-rolls $o$ and $n$, the idle-rolls $q$, co-operating with the rolls $o$, the shaft $m'$, geared to the shafts of said feed-rolls, the shaft $j'$, geared to the shaft $m'$ and having the gear $i'$, the shaft $e'$, having the gear $h'$, meshing with the gear $i'$, the pinion $d'$ and ratchet $f'$, mounted loosely on the shaft $e'$, said ratchet engaging a pawl on the gear $h'$, the rack $c'$, meshing with the pinion $d'$, and mechanism for reciprocating said rack, and the severing mechanism to which the fabric is presented by said rolls, all arranged and operating substantially as set forth.

9. In a machine for preparing fabric for the manufacture of hose, the combination of the cloth-feeding mechanism, the table G, the cutting-blade $d$, and its operating mechanism, of the intermittingly-rotated feed-roll O at one end of said table and the pressure-roll P, arranged to co-operate with said feed-roll, as set forth.

10. In a machine for preparing fabric for the manufacture of hose, the combination of the cloth-feeding mechanism, the table G, the cutting-blade $d$ and its operating mechanism, the intermittingly-rotated feed-roll O at one end of said table, the pressure-roll P, arranged to co-operate with said feed-roll, a loose roll S, and a support or holder therefor located above the feed and pressure rolls, whereby an adhesive ribbon may be supplied to the strip passed between said rolls from the table, as set forth.

11. In a machine for preparing fabric for the manufacture of hose, the combination of the table G, the intermittingly-rotated feed-roll O at one end thereof, mechanism for operating said roll, the pressure-roll P, arranged over said feed-roll, a loose roll S over the pressure-roll, and a guide between the loose roll and pressure-roll, as set forth.

12. In a machine for preparing fabric for the manufacture of hose, the combination of the table G, the intermittingly-rotated feed-roll O at one end thereof, mechanism for operating said roll, the pressure-roll P, arranged over said feed-roll, a loose roll S over the pressure-roll, and a second roll 36, located above the roll S, so as to be rotated by contact therewith, as set forth.

In testimony whereof I have signed my name to this specification, in the presence of two subscribing witnesses, this 31st day of December, A. D. 1888.

ROBERT COWEN.

Witnesses:
  C. F. BROWN,
  W. C. RAMSAY.